United States Patent [19]

Flynn et al.

[11] 3,846,325

[45] Nov. 5, 1974

[54] ANTI-POLLUTION AND DETERGENT COMPOSITION

[75] Inventors: Francis Gerard Flynn, Toronto; Philip Harrhy Jones, Aurora, Ontario, both of Canada

[73] Assignee: Torau Company, Aurora, Ontario, Canada

[22] Filed: June 21, 1972

[21] Appl. No.: 264,736

Related U.S. Application Data

[63] Continuation-in-part of Ser. No. 16,942, March 5, 1970, abandoned.

[52] U.S. Cl. ................ 252/99, 252/95, 252/96, 252/89, 252/156, 252/DIG. 11, 252/DIG. 15
[51] Int. Cl. ................................................ C11d 7/56
[58] Field of Search .......... 252/95, 96, 99, 89, 156, 252/DIG. 11, DIG. 15

[56] References Cited
UNITED STATES PATENTS 3,654,168   4/1972   Gaiser.............................. 252/135

OTHER PUBLICATIONS

Soap & Chemical Specialties, Sept. 1966, page 59-62, 130-135 — "Amine Acid Chelating Agents in Detergent".

*Primary Examiner*—Mayer Weinblatt
*Attorney, Agent, or Firm*—Douglas S. Johnson

[57] ABSTRACT

An anti-pollution and detergent composition comprising a biodegradable surface active agent component, a biodegradable alkaline water softening agent, a biodegradable anti-redeposition agent and an inorganic buffering alkali, the composition being characterized in that it is essentially free of phosphates.

9 Claims, No Drawings

ANTI-POLLUTION AND DETERGENT COMPOSITION

The instant application is a continuation-in-part of applicant's application Ser. No. 16,942 filed Mar. 5, 1970 for ANTIPOLLUTION AND DETERGENT COMPOSITION (now abandoned).

FIELD OF THE INVENTION

This invention relates to an anti-pollution and detergent composition. More particularly, this invention provides a highly effective washing composition or detergent which, on discharge into a waste treatment plant such as a biological or secondary waste plant, acts as a non-toxic anti-pollution agent to reduce pollution in the liquid effluent from the waste treatment plant. This invention therefore also provides a process for upgrading the quality of effluent from a waste treatment plant.

BACKGROUND OF THE INVENTION

It is now well recognized that there is a great urgency for effective measures to be taken not only to prevent the further pollution of water systems, but to reduce their present level of pollution. One of the major contributors to the existing pollution conditions in water systems is the continuous large scale addition to the water systems of phosphate-containing waste effluents from various sources. The phosphates upset the normal plant-growth limiting balance in the water system, by over enrichment or eutrophication of the water body, giving rise to uncontrolled plant or algae growth. This, in turn upsets the ecological balance of the system, destroying aquatic life, and ultimately rendering the water unpotable or otherwise unfit for most human uses.

One of the major sources of phosphates introduced into the water systems is phosphates which are present in the drain water after washing — particularly laundry as well as dishes and cooking utensils, industrial washing and cleansing etc. — and which are therefore introduced into waste treatment plants. This is because nearly all of the known commercial detergent products contain a substantial quantity of phosphates, and their use is extremely extensive. The use of phosphates in the present commercial detergent products has been dictated by the fact that have, to the present date, been found necessary in order to produce an effective cleansing action. Thus, the intended purpose of commercial detergent products in use has been allowed to outweigh the serious detrimental consequences which result from the discharge of drain water following the use of the commercial detergent products into the water systems.

At the same time, there are many organic sources of phosphorus which may be found in waste treatment systems, including agricultural runoff and human waste. Because the growth of plant life in water requires a balanced diet of nutrients — including phosphorus, nitrogen and carbon — whichever of those nutrients is in the shortest supply relative to the plant's nutritional needs will limit plant growth. Ordinarily, in a waste treatment system, and in water systems including water systems which are eutrophying, it is phosphorus which is the limiting nutrient for the growth of plants and algae. By improving the quality of the liquid effluent from a waste treatment plant, which is manifested in the discharge of effluent which is phosphorus-poor with respect to the balanced metabolic diet required for plant and algal growth in water, eutrophication of water systems may, in time, be retarded or reversed.

SUMMARY OF THE INVENTION

The present invention has evolved from the concept that introduction into a waste treatment plant of substances which will take into account the metabolic diet of the micro-organisms which are required to remove the organic carbon content of the waste materials in that system, would also result in the extraction of phosphorus from the waste system and thereby reduce the phosphate content of the liquid effluent from the waste treatment plant, and thereby upgrade the quality of the effluent. If such a substance could, at the same time, eliminate one of the major sources of phosphates in the waste treatment system — namely, commercial, heavy-duty detergents — there would be significant beneficial effect to the ecology with respect to present pollution problems.

Phosphates, and frequently other substances which create undesirable conditions in water systems, have been considered essential to provide an effective cleaning action. [See for example, Irani, U.S. Pat. No. 3,368,978, issued Feb. 13, 1968, which, after many tests such as those set out in Tables 1 and 2 concludes at column 9, lines 38 to 42, that it is necessary to have the proper proportions of an organic sequestering agent, sodium tripolyphosphate and an inorganic alkali metal salt in the builder composition in order to achieve improved builder efficiency.] However, it has been discovered that it is possible to obtain an anti-pollution composition which is phosphate-free, and which is free of other substances which may give rise to any toxic or undesirable condition in a water system; and yet the anti-pollution composition is capable of providing a cleaning action which is fully equal to the best and superior to most of the present commercial detergents.

Therefore, this invention provides a non-toxic washing composition or "detergent" which provides excellent cleaning ability and which at the same time not only eliminates the introduction of phosphates and toxic or other undesirable substances into water systems, promotes a demand by the micro-organisms found in a waste treatment system and their metabolic diet requirement for phosphorus. Thus, micro-organisms found in a waste treatment scavenge phosphates from other waste sources and thereby perform as an anti-pollution agent and act to upgrade the quality of liquid effluent from the waste treatment plant.

More particularly, the anti-pollution detergent composition of the present invention comprises a non-toxic, phosphate (ie. phosphorus) free or at least essentially phosphorus-free biodegradable composition, containing a biodegradable surface active agent component, a phosphate-free biodegradable alkaline water softening agent, a biodegradable anti-redeposition agent, and an inorganic alkali buffering agent. The anti-pollution detergent composition of the present invention has the characteristics that it is non-toxic and degradable by microbial action and, by virtue or its carbon and nitrogen content, in degrading it places a demand on the phosphorus content of the waste treatment system — because of the balanced metabolic diet of the micro-organisms present therein — and thereby upgrades the quality of effluent from the waste treatment.

This invention will be more fully understood from the following detailed description and examples.

DETAILED DESCRIPTION OF THE INVENTION

As noted, the present invention is an anti-pollution and detergent composition which consists essentially of a biodegradable surface active agent component, a phosphate-free biodegradable alkaline water softening agent, a biodegradable anti-redeposition agent and an inorganic alkali buffering agent. The composition is essentially phosphate-free; and the present invention does not relate simply to the substitution of phosphorus containing compounds of known detergent formulations with trisodium nitrilo triacetate or nitrilo triacetic acid (NTA). Also, degradation in a waste treatment system of an anti-pollution and detergent composition according to the present invention places a demand on phosphates which are found in that waste treatment system from other sources including agricultural runoff and human waste; and eutrophication within a waste treatment system in which the anti-pollution and detergent composition of this invention is found is eliminated without the addition of excess nitrogen to the system. Suitable additives as are found in commercial detergent compositions, including a bleaching agent, a brightening agent or a blueing agent, perfume and anti-caking agents may be added to a composition according to this invention without affecting its anti-pollution and detergent characteristics.

THE SURFACE ACTIVE AGENT COMPONENT

The anti-pollution and detergent composition according to the invention incorporates a surface active agent component which preferably includes at least one anionic surface active agent comprising a linear aliphatic hydrocarbon which has been sulfonated or sulfated and which is biodegradable, for example, linear alkyl aryl sulphonate. Such anionic surface active agents, for example, are available under the trade marks Sterling L.A. Paste (60 percent) and Sterling A.B. 80 beads, both available from Canada Packers, and S.N. Paste (60 percent) (trademark) available from Lever Brothers. These examples of anionic surface active agents consist essentially of a sodium salt of linear dodecyl benzene sulphonic acid. The function of the anionic surface active agent is to reduce the surface tension of the washing liquid and to remove soils from the fabrics being washed. The linear alkyl aryl sulphonate has the characteristic that it readily degrades by microbial action on discharge into the waste treatment plant and it is free of any substance which either by itself or in combination with any other substance in the water system creates any toxic or undesirable condition.

The surface active agent component may additionally include further anionic surface active agents such as fatty acid sulfate derivatives or fatty alcohol sulphonate derivatives. In particular, commercial forms of sodium lauryl sulphate have been found acceptable and they are readily biodegradable and are free of any constituent which would create any toxicity in the system into which it is discharged. Sodium lauryl sulphate is the sodium salt of a sulphated lauryl alcohol mixture and is commonly referred to as lauryl alcohol sulphate. Further reference herein to lauryl alcohol sulphate is meant to refer to commercial grades of sodium lauryl sulphate such as Orvus W.A. Paste (trademark) from Procter & Gamble and Sterling W.A. Paste (trademark) from Canada Packers. Lauryl alcohol sulphate serves to reduce the surface tension of the bath, to impart an emulsifying power to the bath, to give a "soapy" hand to the bath and to assist in soil removal from fabrics.

Preferably the composition also includes a non-ionic surface active agent which may, for example, be a coconut oil amine condensate modified with an amine oleate, an iso-octyl phenoxy polyethoxy ethanol, a nonyl phenoxy polyethoxy ethanol; other non-ionic surface active agents may be derived from sugar, particularly glucose, sucrose, fructose and other polysaccharides. These surface active agents are prepared by ethoxylation and/or propoxylation of polysaccharides to the extent that they exhibit satisfactory surface active properties with water. In each case the requirement is that the non-ionic surface active agent be readily degradable by microbial action, and be incapable of contributing any toxicity in the water system in which it is discharged.

Coconut oil fatty acid amine condensates have been found particularly effective and in the composition of the invention appear to provide a synergistic effect in combination with the anionic surface active agent or agents to materially enhance the cleansing power of the composition with a material increase in the reduction of the the surface tension of the bath through removal and emulsifying power noted.

The non-ionic surface active agent such as coconut oil fatty acid amine condensate also provides the function where the product is to be sold as a powder of acting as a wetting agent to reduce the dustiness of the powdered formulation.

Suitable non-ionic surface active agents of the coconut oil fatty acid amine condensate type can be obtained from Proctor & Gamble under the (trademark) designations C-110, C-120 or C-130; or from Canada Packers Limited designated as coconut acids under the trademarks "double distilled" and "double distilled hydro." The fatty acid constituent of such products ranges from caprylic acid (C8) to stearic, oleic and linoleic acid (C18); and has a range of molecular weight of 144 to 284. The fatty acid constituents of typical commercial products may be as follows:

TABLE 1

| | Coconut Oil Fatty Acid Amine Condensate | | | | |
|---|---|---|---|---|---|
| | Canada Packers | | Procter & Gamble | | |
| Fatty Acid | Double * Distilled | Double * Distilled Hydro | C-110* | C-120* | C-130* |
| Caprylic Acid — C8 | 5 | 5 | 6 | 6 | 5 |
| Capric Acid — C10 | 7 | 7 | 6 | 6 | 5 |
| Lauric Acid — C12 | 48 | 48 | 54 | 56 | 55 |
| Myristic Acid — C14 | 20 | 20 | 18 | 17 | 19.5 |
| Palmitic Acid — C16 | 10 | 10 | 8 | 7 | 7 |

TABLE 1-Continued

Coconut Oil Fatty Acid Amine Condensate

| Fatty Acid | Canada Packers | | Procter & Gamble | | |
|---|---|---|---|---|---|
| | Double *<br>Distilled | Double *<br>Distilled<br>Hydro | C-110* | C-120* | C-130* |
| Stearic Acid — C18 | 3 | 10 | 2 | 4 | 2 |
| Oleic Acid — C18' | 6 | — | 5 | 4 | 5 |
| Linoleic Acid — C18'' | 1 | — | 1 | — | 1.5 |

*trademark

Other suitable non-ionic surfactants of the isooctyl phenoxy polyethoxy ethanol and nonyl phenoxy polyethoxy ethanol type can be obtained from Rohm & Haas under the trade mark Triton X-100; from General Aniline and Film under the trade mark Igepal Co-610; from Atlas Chemical under the trade mark Tween 80 and from Canada Packers under the trade mark Sterling XE. In the above examples, the number of polyethoxy groups in each case is from 5 and 10.

ALKALINE WATER SOFTENING AGENT

In accordance with the invention, the composition includes an alkaline water softening agent which is readily degradable by microbial action. The wash bath, for effective and apparently synergistic action of the constituents of the surface active agent component in the composition of the invention, is required to be on the alkaline side. Furthermore, the wash bath water must be soft and therefore it is necessary to chelate, sequester or remove the metal ions contributing to water hardness in the bath solution. The preferred water softening agent according to the invention is trisodium nitrilo triacetate. Some commercially available forms of trisodium nitrilo triacetate are available, for example, from Hampshire Chemical Company, and from Geigy under the trade mark CHEL NA3-NTA.

Trisodium nitrilo triacetate has been found in the composition of the invention to apparently enhance the synergistic effect of the anionic and non-ionic surface active agents while at the same time providing an essential water softening function. Other acceptable alkaline water softening agents are sodium citrate, tetrasodium ethylenediaminetetraacetate, trisodium hydroxyethyliminodiacetate.

It is of course the intention of the invention that no phosphate water softening agent be utilized. The above described water softening agents which may be employed according to the invention all have the characteristics of being phosphate-free, they are readily degradable by microbial action, and they are free of any constituents which would creat a toxic condition in the water system into which they may be discharged.

ANTIREDEPOSITION AGENT

The composition according to the invention also includes an antiredeposition agent to inhibit the redeposition of soils which have been removed during the washing action. According to the invention, a biodegradable anti-redeposition agent is selected such as sodium carboxymethylcellulose (degree of acyl substitution being from 0.7 to 2.5). Another suitable antiredeposition agent is sodium alginate. Again, these agents do not incorporate any toxic substances which would contribute to pollution in the water system, and they are all biodegradable.

BUFFERING ALKALI

In accordance with the invention, a buffering alkali is employed. Suitable alkalis are the soluble silicates such as sodium metasilicate, sodium orthosilicate and sodium sesquisilicate. Sodium carbonate and also borax may be used.

The use of the buffering alkali provides and sustains an alkaline environment in the wash bath solution, and enhances the detergency of the surface active agent component. It also inhibits corrosion of stainless steel and aluminum in washing machines and the like.

In the composition according to the invention, the buffering alkali also appears to perform to some extent the functions of water softening, soil suspension, antiredeposition and reduction of surface tension of the wash bath solution. It also appears to contribute an emulsifying action with the other ingredients of the detergent composition.

The buffering alkali is selected so that on discharge into a water system, it will not give rise to any toxicity, or enter into or interfere with the normal ecological balance of the system.

FILLER

In the art of manufacturing detergents it is conventional to use fillers to facilitate measurement of practical quantities by the user. The composition of the present invention may also incorporate a filler provided that the filler itself does not constitute a pollution nuisance. By way of example, fillers comprising sodium sulphate or sodium carbonate may be used. A filler such as synthetic calcium silicate, sold under the trade mark Microcel E by Canadian Johns Manville Company Limited can also be used, and this filler functions as well to prepare the composition in dry powder form. Where sodium carbonate is used, it may also contribute to water softening and to the alkalinity of the wash bath solution.

The presence of synthetic calcium silicate (such as Microcel E) has been found important in the effectiveness of the composition when, for example, it is to be used in cleaning heavily soiled clothing. It would appear that the combination of the synthetic calcium silicate with the alkaline water softening agent, the antiredeposition agent and the alkali provides some form of complex encapsulation to hold any soil grease and carbon black in suspension so that they are not redeposited during successive rinse or wash cycles.

Where the composition is to be used in liquid form and for lightly soiled clothing, the need for the complexing suspension characteristics of the synthetic calcium silicate may not be required to obtain satisfactory cleaning results.

MINOR CONSTITUTENTS

It will be understood that various materials which may be considered to be Minor Ingredients of detergent formulation may be incorporated into the composition of this invention, if desired, provided they do not in themselves contribute to the pollution of the water system into which the composition is to be discharged. For example, the composition may incorporate small amounts of optical brighteners (e.g. those sold by Geigy under the trade marks Tinopal R.B.S. 200 and Tinopal D.M.S. Conc.) blueing agents such as Ultramarine Blue; perfumes; disinfectants; germicides and anticaking agents (of which sodium carboxy methyl cellulose is an example); bleaching agents such as sodium trichloroisocyanurate (e.g. those sold under the trade mark C.D.B. 63 by F.M.C. Corporation) and other desired agents.

FORMULATION

In general an anti-pollution and detergent composition in wet or liquid form according to the invention may be formulated as follows, in general terms:

| Ingredient | Percent by Weight |
| --- | --- |
| Non-toxic biodegradable surface active agent component | 5 – 35 |
| Non-toxic biodegradable phosphate-free alkaline water softening agent | 5 – 60 |
| Non-toxic biodegradable anti-redeposition agent | 1 – 15 |
| Non-toxic phosphate-free alkali | 5 – 35 |
| Non-toxic phosphate-free filler | 0 – 70 |

The formula may also contain a minor amount of a bleaching agent in an amount preferably less than 1 percent and not substantially greater than 2 percent, by weight; a brightening agent for cotton and brightening agent for synthetics which each may be added in amount of about 0.01 percent by weight; a blueing agent which may be conveniently added in an amount of about 0.01 percent by weight; and a suitable odorant or perfume for detergent use in an amount of about 0.01 percent by weight.

When the formula is to be made up as a dry powder, the formula may be made up as follows, in general terms:

| Ingredient | Percent by Weight |
| --- | --- |
| Non-toxic biodegradable surface active agent component | 5 – 35 |
| Non-toxic biodegradable phosphate-free alkaline water softening agent | 5 – 60 |
| Non-toxic biodegradable anti-redeposition agent | 1 – 15 |
| Non-toxic phosphate-free alkali | 5 – 35 |
| Non-toxic phosphate-free filler | 0 – 70 |
| Synthetic calcium silicate | 1 – 10 |

Again the bleaching, brightening and blueing agents, where desired, are added as in the case of the wet formula.

Specific formulations according to the general wet and dry formulae have been carefully tested for their cleaning ability and have been found to give effective cleaning action when functioning as a detergent. When the surface active agent component was selected to utilize the synergistic effect of the anionic and non-ionic surface active agents a cleansing action equal or superior to nearly all of the commercially available detergents was achieved. When, in addition to the optimum selection of the surface active agents, the synthetic calcium silicate was introduced to provide the observed marked increase in anti-redeposition activity, the cleaning results on heavily soiled clothing were outstanding.

Tests were also made of the effects of introducing detergents, whose formulations were included in the general formulations set out above and which had exhibited satisfactory detergent action, into a waste treatment system. In particular the biodegradability of the formulations and the phosphate content in the systems were observed. The formulations were found to be readily biodegradable and measurement of filtered samples taken from the waste system showed a remarkable reduction in the phosphate content as compared to the phosphates present in a similar system and to which an equivalent amount of conventional detergent had been introduced. In the case of the addition of the composition of the invention, the soluble phosphate content of the system was less than the soluble phosphate content prior to its addition. On the other hand in the case of the addition of the conventional phosphate containing detergents the soluble phosphate content of the system was substantially increased. [These tests are discussed in greater detail hereafter.]

It is apparent that the composition of the invention caused soluble phosphates to be taken out of the waste treatment system and into the sludge which is removed in the normal operation of a waste treatment plant.

This can be explained theoretically as follows: the anti-pollution and detergent composition of the invention contains carbon and nitrogen but the composition does not contain any phosphates (phosphorus). The carbon and nitrogen constituents, because they are present in biodegradable components of the composition, constitute nutrients for the micro organisms in a waste treatment system or plant. These micro organisms, whose function it is to remove the organic carbon from the waste introduced into the plant, have a metabolic system such that for approximately every thirty-five to fifty pounds of carbon consumed approximately five pounds of nitrogen and approximately one pound of phosphorus are demanded. The composition of the invention supplies the available carbon and nitrogen in an appropriate balance, but lacking phosphates (phosphorus) the micro organisms seek out the phosphates which are present in excessive amounts from other wastes entering the waste treatment system. As a result, the introduction of the constituents of the composition of the present invention into the waste treatment system actually effects the reduction of the phosphate content in such system, and substantially removes one pound of phosphorus for every thirty-five to fifty pounds of carbon and five pounds of nitrogen introduced.

While an excess of phosphates are introduced into the sewage treatment plants from other sources such as agricultural runoff or human waste, the known commercial detergents are reported to contribute approximately two-thirds of the phosphates introduced into the waste treatment systems. By utilizing the composition of the present invention, a dramatic reduction of phosphates being released in the liquid effluents of waste treatment plants into receiving water systems may be realized. Such phosphate reductions that may be brought about could exceed greater than two-thirds, by virtue of the phosphorus extraction phenomenon as described above.

The significance of utilizing the composition of the present invention will be apparent when the millions of pounds of detergents used is considered. The elimination of phosphates is extremely important from the standpoint of reducing pollution. In an unpolluted water system, it is the limitation on the amount of phosphates present therein which provides the control on the growth of algae and plant life which need phosphates in addition to carbon, nitrogen and oxygen. When, however, phosphates are introduced into the water system in substantial quantities, eutrophication takes place, and the over-enrichment of the water system causes rapidly accelerated and undesirable growth of the algae and plant life.

The unchecked growth of algae or plant life ultimately places a demand on the oxygen present in water systems, by promoting growth of bacterial life detrimental to the higher aquatic or marine life of a system. Ultimately the higher aquatic or marine life is eliminated, and the water quality is reduced to the point where it is unfit for most uses.

To further illustrate the invention, specific examples of anti-pollution and detergent composition which have been formulated and tested are given below:

EXAMPLE 1

| Ingredient | Parts by Weight |
|---|---|
| Lauryl alcohol sulphate | 2.0 |
| Linear alkyl aryl sulfonate | 15.0 |
| Trisodium nitrilo triacetate | 50.0 |
| Sodium carboxymethylcellulose | 5.0 |
| Sodium trichloroisocyanurate | 2.0 |
| Sodium orthosilicate | 26.0 |
| | 100.0 |

A solution for washing was made up containing 2.0 grams per litre of the composition of Example I. The solution was found to have satisfactory detergent qualities, and to provide a highly desirable anti-pollution activity.

EXAMPLE II

| Ingredient | Parts by Weight |
|---|---|
| Lauryl alcohol sulphate | 2.00 |
| Linear alkyl aryl sulphonate | 11.00 |
| Coconut oil fatty acid amine condensate | 1.00 |
| Sodium carboxymethylcellulose | 5.50 |
| Trisodium nitrilo triacetate | 17.50 |
| Sodium metasilicate | 12.2 |
| Sodium sulphate anhydrous | 48.965 |
| Sodium trichloroisocyanurate | 0.20 |
| Optical brightener (Tinopal R.B.S. 200 and Tinopal D.M.S. Conc.) | 0.020 |
| Ultramarine Blue | 0.010 |
| Perfume | 0.005 |
| Anhydrous calcium silicate | 1.60 |
| | 100.00 |

The above formulation was a free flowing powder which was found to have exceptional cleaning ability, as well as constituting an important anti-pollution agent.

EXAMPLE III

| Ingredient | Parts by Weight |
|---|---|
| Linear alkyl aryl sulphonate | 11.00 |
| Nonyl phenoxy polyethoxy ethanol | 2.00 |
| Coconut oil fatty acid amine condensate | 1.00 |
| Sodium carboxymethylcellulose | 5.50 |
| Trisodium nitrilo triacetate | 17.50 |
| Sodium metasilicate | 12.2 |
| Sodium sulphate anhydrous | 48.965 |
| Sodium trichloroisocyanurate | 0.20 |
| Optical brighteners | 0.020 |
| Ultramarine Blue | 0.010 |
| Perfume | 0.005 |
| Anhydrous calcium silicate | 1.60 |
| | 100.00 |

The above formulation was made up as a solution containing 2.0 grams per litre of active ingredient, and was found to have exceptional cleaning ability as well as constituting an important anti-pollution agent.

EXAMPLE IV

| Ingredient | Parts by Weight | | | |
|---|---|---|---|---|
| | A | B | C | D |
| Lauryl alcohol sulphate | 3.7 | 3.7 | 3.7 | 3.7 |
| Linear alkyl aryl sulphonate | 28.4 | 28.4 | 28.4 | 28.4 |
| Trisodium nitrilo triacetate | 33.0 | 16.0 | 66.0 | 33.0 |
| Sodium carboxymethylcellulose | 13.5 | 13.5 | 13.5 | 6.8 |
| Sodium metasilicate | 44.0 | 44.0 | 44.0 | 44.0 |
| Sodium trichloroisocyanurate | 0.2 | 0.2 | 0.2 | 0.2 |
| Optical brighteners | 0.02 | 0.02 | 0.02 | 0.02 |
| Ultramarine Blue | 0.01 | 0.01 | 0.01 | 0.01 |
| | 122.83 | 105.83 | 155.83 | 116.13 |

All of the above formulations of Example IV exhibited satisfactory cleaning ability as well as constituting important anti-pollution agents. Formulation C of Example IV exhibited the optimum cleaning power while Formulation B was the most economical to formulate.

While the normal discharge of wash water is into a waste treatment plant for exposure to the microbial action therein, it is a feature of the invention that even if the wash water is discharged directly into a water system or as surface runoff without first passing through such concentrated biological processing, the wash water will still be fairly rapidly biodegraded in the natural water system and will not provide an undesirable cumulative effect. Further it will be noted that to replace the phosphate of a known commercial detergent formulation such as that exemplified by Irani U.S. Pat. No. 3,368,978 with NTA, would result in a detergent composition which would not have significant cleansing action. Also, eutrophication is effectively eliminated without the addition of excess nitrogen to water systems, particularly fresh water systems such as are found inland in North America, and including the Great Lakes.

Turning to the problem of the removal of phosphorus from a waste treatment system in significant amounts to prevent eutrophication — whereby a biodegradable phosphate-free composition according to this invention places a demand on phosphates found in a waste treatment system from such other sources as agricultural runoff and human wastes — it should be remarked that waste which is fed to a bioactive waste treatment plant is acted on by micro-organisms so that organic carbon is removed from the waste system. The micro-organisms normally found in such a waste treatment plant have a metabolic system or diet which requires that for approximately every 35 to 50 pounds of carbon consumed, approximately 5 pounds of nitrogen and approximately 1 pound of phosphorus is consumed. If a waste treatment plant is considered where a decreased amount of phosphorus is introduced into the waste system — particularly as a result of the use of phosphate-free detergents — the micro-organisms present in the waste treatment system will search elsewhere for phosphorus in order to satisfy their metabolic requirements for continued growth. As discussed above, the amount of free phosphorus content in the liquid discharge effluent from a waste treatment plant will therefore be reduced, since phosphorus from other sources will be consumed in the waste treatment system by micro-organisms. The quality of the liquid effluent from the waste treatment plant is therefore upgraded. Example V, which follows, shows how a phosphate-free detergent formulation in accordance with the present invention places a demand on the phosphates which are present in a waste treatment system from other sources, with the result that there is removal of soluble phosphates from that system; whereas the addition of a commercial detergent to an identical waste treatment sample did not result in any significant reduction in soluble phosphates.

EXAMPLE V

Two triplicate sets of waste treatment system reactor samples were taken, where each sample comprised 500 mls., and each sample was aerated for 24 hours. 250 mls. of detergent solution of 0.200 g/L of detergent formulation was then added to each sample. The first series of samples had a detergent formulation in accordance with this invention as set out below; and the second series of samples was tested with a commercial detergent sold by Procter and Gamble Limited under the trade mark "Tide XK" purchased in Toronto, Canada in Autumn of 1970, and estimated to contain some 58 percent of sodium tripolyphosphate.

Test samples were drawn from each reactor at 0 hours and 4 hours, and tests were performed. The test samples taken from each reactor were of the same volume and each sample was divided into two parts. One part was tested for total phosphate analysis and one was tested for soluble phosphate analysis.

The total phosphate test sample was, in each case, diluted 1:1 with distilled water. The soluble phosphate test sample was the filtrate after filtering through a Whatman GF/A glass fibre paper of diameter 7.0 cm.

In order to assure homogeneity of the contents, the jars in which each reactor was contained were frequently swirled, and each was swirled before sampling. The results are as set out in table 2 below.

[The phosphate analysis which were performed in all of the test samples were consistent throughout, and were based on a modification of the aminonaptholsulphonic acid method such as set out in G. W. Heinke Ph. D. thesis, McMaster University, May 1969 "Hydrolysis of Condensed Phosphates in Lake Water and Waste Water."]

TABLE 2

Phosphorus Utilization Test

| Reactor Series | Reactor No. | Time 0 Hours | | 4 Hours | |
|---|---|---|---|---|---|
| | | Total $PO_4^{\equiv}$* mg/L | Soluble $PO_4^{\equiv}$* mg/l | Total $PO_4^{\equiv}$* mg/L | Soluble $PO_4^{\equiv}$ mg/L |
| I | 1 | 148 | 10.75 | 154 | — |
| Formula | 2 | 150 | — | 155 | 6 |
| N | 3 | 148 | 13.1 | 154 | 6 |
| | Mean | 148.7 | 12.1 | 154.3 | 6 |
| II | 1 | 169 | 32.5 | 160 | 29 |
| Tide | 2 | 159 | 30.5 | 158.5 | 30.5 |
| XK | 3 | 163 | 32.5 | 160 | 30.0 |
| | Mean | 163.7 | 31.5 | 159.5 | 30.0 |

* Dilution of sample accounted for
- Not Measured

The formulation noted as formula N in Table 2 is a composition according to this invention as set out in Table 3 below.

TABLE 3

| Constituent | Commercial Name (Manufacturer) | Amount (lbs) | % |
|---|---|---|---|
| Soluble Silicate | Metso Beads 1048 Anhydrous (National Silicates) | 24.4 | 12.1 |
| Lauryl Alcohol Sulfate | Sterling WA Paste (Canada Packers) | 2.0 | 0.993 |
| Linear Alkylate Sulfonate | Sterling AB 80 Beads (Canada Packers) | 22.0 | 10.9 |
| Trisodium Nitrilo-triacetate | Na$_3$NTA Monohydrate (Hampshire Chemicals) | 37.0 | 18.4 |
| Sodium Carboxy-methylcellulose | Carboxel D435 (Chemical Developments) | 11.0 | 5.46 |
| Lauryl Alcohol Poly-glycol Ether Condensate | Sterling XE (Canada Packers) | 2.0 | 0.993 |
| Synthetic Calcium Silicate | Microcell E (Cdn. Johns-Manville) | 3.20 | 1.59 |
| Sodium Sulfate | Sodium Sulfate Anhydrous (C.I.L.) | 100.0 | 49.7 |
| Odorant | | 0.01 | 0.00497 |
| Optical Brightener for Nylon, Wool, Acetate and Cotton | Tinopal RBS-200% (Geigy) | 0.01 | 0.00497 |
| Optical Brightener for Cotton | Tinopal DMS - Concentrate (Geigy) | 0.03 | 0.01491 |
| Ultramarine Blue | Ultramarine Blue (Chemitron) | 0.02 | 0.00994 |
| | | 201.6 | 100.17 |

EXAMPLE VI

There follows the formula composition of tri-sodium NTA, namely:

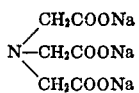

In 1 pound-mole of tri-sodium NTA, there will be the following constituents, to the nearest pound:

```
N — 14  lbs.
C — 72  lbs.
H — 6   lbs.
O — 96  lbs.
Na — 69 lbs.
```

Thus, for every 14 lbs. of nitrogen, there are supplied 72 lbs. of carbon in 1 pound-mole of tri-sodium NTA; and for 5 lbs. of nitrogen, there would be supplied 72/14 × 5 ≈ 26 lbs. carbon. Taking, for example, the metabolic diet for micro-organisms found in a waste treatment system or plant as set out above — where for every 35 to 50 pounds of carbon consumed, approximately five pounds of nitrogen and one pound of phosphorus are demanded — there is found a metabolic diet based on carbon, nitrogen and phosphorus as follows:

C — 35–50 lbs.
N — 5 lbs.
P — 1 lb.

Thus, any additional carbon above the 26 lbs. which is supplied by NTA for every 5 lbs. of nitrogen in the detergent composition of the present invention is easily supplied by the other components of the degradable detergent composition, e.g. the fatty acids or the linear alkyl aryl sulphonate. However, for a micro-organism metabolic diet as set out above, there is no phosphorus supplied by the detergent composition, and the phosphorus is therefore taken from the waste system from phosphates which already exist therein from other sources. Thus, a demand on phosphates in the waste treatment system is created. Further, it will be seen that for every 5 lbs. of nitrogen introduced into the waste treatment system, so long as there are phosphates present from other sources such as other detergents, organic waste from agricultural runoff and human waste, etc., there will be sufficient carbon available in the system to completely utilize all of the nitrogen introduced by the tri-sodium NTA component of the detergent composition of this invention, and there will be no excess nitrogen.

Thus, eutrophication can be eliminated without the addition of excess nitrogen to natural water systems, particularly fresh water systems such as the Great Lakes.

EXAMPLE VII

Tests were carried out by householders using a detergent composition identical to that set out in Table 3. The tests were carried out in water hardnesses ranging from soft to hard, with coloured and white laundry, and in automatic laundry apparatus. In all cases the cleaning efficiency was subjectively rated as compared with the commercial laundry detergents normally used by the householders — of which some 12 or 13 brand names were mentioned — and in all cases the cleaning efficiency was rated as being at least equivalent to the commercial products.

HEAVY METAL CHELATION

The likelihood of chelation of cations of such heavy metals as lead, mercury, tin or zinc is not considered to pose any serious threat. In the first instance, there is a much higher concentration of innocuous cations of iron and calcium than of the heavy metal cations; and NTA complexes of iron and calcium have biodegradation characteristics comparable to those of NTA alone. Further, under reducing conditions such as sewers, where sulphur is readily found, as well as in waste treatment systems, the activity of the sulphide ion far exceeds that of NTA; so that the formation of sulphide precipitates would be favoured over the formation of soluble NTA complexes of heavy metals. Thus, there is very little likelihood of any NTA — heavy metal chelates occurring, nor any likelihood of enhancement of heavy metal transport through sewage treatment systems to natural water systems. As noted, non-toxic metals such as calcium and iron are readily found in water systems and waste systems, and would favourably compete with any toxic metals for the chelation capacity of any NTA present.

Upgrading of Quality of Liquid Effluent from Waste Treatment Plants

There has been discussed above several examples and illustrations of the manner in which the quality of the liquid effluent from a waste treatment plant might be upgraded. In so speaking, particular reference is made to the reduction of free phosphorus content in the liquid effluent; as well as to the unlikelihood of any soluble NTA complexes of heavy metals or other heavy metals or other heavy metal transport from the waste system. It has been remarked that the anti-pollution and detergent composition of this invention acts to serve these purposes.

The occasion may arise, however, when it is desired to improve or upgrade the quality of the liquid effluent from a waste treatment plant by direct addition to the waste treatment system of a composition which will achieve that purpose. As noted, a detergent composition according to this invention will do so; but such a composition is introduced to the waste treatment system as part of the sewage being conducted thereto by such means as a municipal sewerage network. If — for example, during periods of heavy spring runoff — the operator of a sewage treatment plant is required to upgrade the quality of the liquid effluent therefrom, he may therefore do so by direct addition of a detergent formulation according to this invention. However, in such circumstances the addition of the biodegradable anti-redeposition agent and the inorganic buffering alkali agent directly to a waste treatment system — while not in any way harmful — is essentially not required, because those components are included in the detergent composition for purposes of increasing its detergency or comparative cleaning efficiency. Thus, an anti-pollution composition according to this invention may consist essentially of a biodegradable surface active agent component of the sort discussed above and a biodegradable alkali water softening agent of the sort discussed: that is, the biodegradable surface active agent may be chosen from the group consisting of a linear alkyl aryl sulphonate, lauryl alcohol sulphate, a coconut oil fatty acid amine condensate, an iso-octyl phenoxy polyethoxy ethanol, a nonyl phenoxy polyethoxy ethanol, polysaccharide-based surface active agents, and mixtures thereof; and the biodegradable alkali water softening agent may be chosen from the group consisting of trisodium nitrilo triacetate, sodium citrate, trisodium hydroxyethyliminodiacetate, tetrasodium ethylenediaminetetraacetate, and mixtures thereof. Those components may be present in the range of from about 5 to 90 percent by weight of the biodegradable surface active agent, and from about 10 to 95 percent by weight of biodegradable alkaline water softening agent. For easy handling, suitable filler materials may also be incorporated in the anti-pollution composition, especially when it is to be made up as a dry powder. Such filler materials may be of the sort discussed above; including sodium sulphate, sodium carbonate, synthetic calcium silicate and mixtures thereof.

While reference has been made frequently to "phosphates" it will be understood that such term applies to phosphorus in any form.

It will be understood by those skilled in the art that variations in the precise formulations may be made to obtain the benefits and without departing from the spirit of the invention or scope of the appended claims.

What we claim is:

1. An anti-pollution and detergent composition consisting essentially of from about 5 to 35 percent by weight of a biodegradable surface active agent selected from the group consisting of a linear alkyl aryl sulphonate, lauryl alcohol sulphate, a coconut oil fatty acid amine condensate wherein the fatty acid constituent has a molecular weight ranging from 144 to 284, an iso-octyl phenoxy polyethoxy ethanol having from 5 to 10 moles of ethoxy groups, a nonyl phenoxy polyethoxy ethanol having from 5 to 10 moles of ethoxy groups, polysaccharide-based surface active agents, and mixtures thereof; from about 5 to 60 percent by weight of a biodegradable alkaline water softening agent selected from the group consisting of trisodium nitrilo triacetate, sodium citrate, trisodium hydroxyethyliminodiacetate, tetrasodium ethylenediaminetetraacetate, and mixtures thereof; from about 5 to 15 percent by weight of a biodegradable anti-redeposition agent being sodium carboxymethyl cellulose having a degree of acyl substitution of from 0.7 to 2.5; and from about 5 to 35 percent by weight of an inorganic buffering alkali agent selected from the group consisting of sodium metasilicate, sodium orthosilicate, sodium sequisilicate, sodium carbonate, borax, and mixtures thereof; said composition being essentially free of phosphates.

2. The anti-pollution and detergent composition of claim 1, containing a filler in an amount up to 70 percent by weight of the composition, and is selected from the group consisting of sodium sulphate, sodium carbonate, synthetic calcium silicate, and mixtures thereof.

3. An anti-pollution and detergent composition as claimed in claim 2 containing up to 2 percent by weight of sodium trichloroisocyanurate as a bleaching agent.

4. An anti-pollution and detergent composition as claimed in claim 2 containing up to 0.02 percent be weight of optical brighteners.

5. An anti-pollution and detergent composition as claimed in claim 2 containing up to 0.01 percent by weight of ultramarine blue as a blueing agent.

6. The anti-pollution and detergent composition of claim 2 in which said surface active agent component is selected from the group consisting of a linear alkyl aryl sulphonate and a lauryl alcohol sulphate.

7. An anti-pollution and detergent composition as claimed in claim 2 where said biodegradable alkaline water softening agent is trisodium nitrilo triacetate.

8. An anti-pollution and detergent composition as claimed in claim 2 where said inorganic buffering alkali agent is a soluble silicate selected from the group consisting of sodium metasilicate, sodium orthosilicate and sodium sesquisilicate.

9. The anti-pollution and detergent composition of claim 6 where said surface active agent component also contains a biodegradable non-ionic surface active agent selected from the group consisting of an isooctyl phenoxy polyethoxy ethanol having from 5 to 10 moles of ethoxy groups, a nonyl phenoxy polyethoxy ethanol having from 5 to 10 moles of ethoxy groups, and a coconut oil fatty acid amine condensate wherein the fatty acid constituent has a molecular weight ranging from 144 to 284.

* * * * *